United States Patent [19]

Bhatti

[11] Patent Number: 4,886,535
[45] Date of Patent: Dec. 12, 1989

[54] FEEDER FOR GLASS FIBERS AND METHOD OF PRODUCING

[75] Inventor: Mohinder S. Bhatti, Newark, Ohio

[73] Assignee: Owens-Corning Fiberglas Corporation, Toledo, Ohio

[21] Appl. No.: 634,198

[22] Filed: Jul. 27, 1984

Related U.S. Application Data

[63] Continuation of Ser. No. 378,297, May 14, 1982, abandoned.

[51] Int. Cl.$^4$ ..................... B21D 28/24; C03B 37/025
[52] U.S. Cl. ......................................... 65/1; 29/421.1; 428/597; 428/940
[58] Field of Search ................ 29/421 R, 421.1; 65/1, 65/2, 12; 428/690, 597, 940

[56] References Cited

U.S. PATENT DOCUMENTS 3,557,446 1/1971 Charschan ................... 29/421 R
4,348,216 9/1982 Bhatti et al. ..................... 65/1

Primary Examiner—Richard D. Lovering
Attorney, Agent, or Firm—Patrick P. Pacella; Gred Dziegielewski

[57] ABSTRACT

A method of fabricating a glass fiber forming feeder is provided comprising positioning a refractory metal core between oxygen impervious, precious metal layers to form a pre-laminate unit, said core having apertures extending therethrough; cold isostatically pressing said unit to move a portion of said layers into said apertures into intimate contact with substantially all of the core defining said apertures; and then hot isostatically pressing said unit to intimately bond said precious metal layers to said core including the portion core defining said apertures to form said laminate to prevent the oxidation of said core at elevated temperatures.

12 Claims, 1 Drawing Sheet

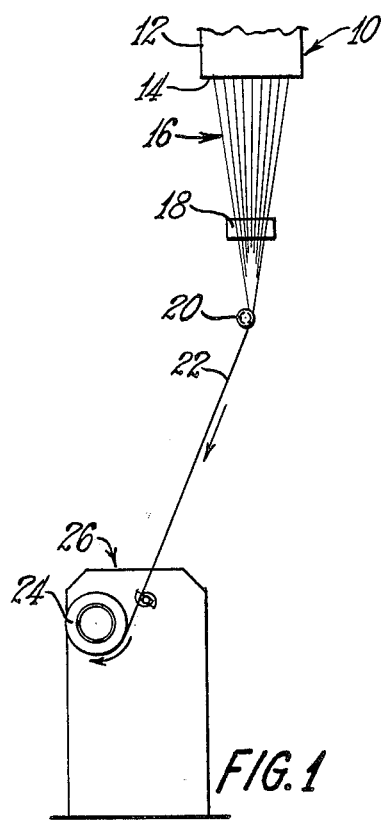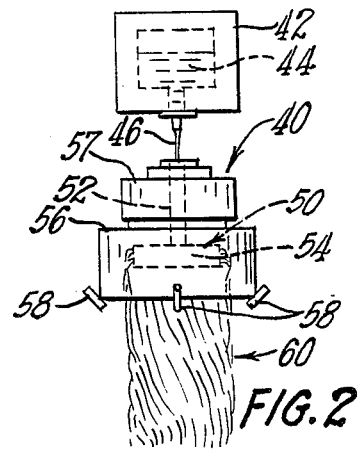

FEEDER FOR GLASS FIBERS AND METHOD OF PRODUCING

This is a continuation of application Ser. No. 378,297, filed 5/14/82 and now abandoned.

TECHNICAL FIELD

The invention disclosed herein relates to a glass fiber forming feeder having at least one laminated wall comprised of a refractory metal substrate having an oxygen impervious, precious metal sheath intimately bonded thereto by means of hot isostatically pressing the precious metal sheath to the refractory metal substrate wherein the sheath is cold isostatically pressed to said substrate to draw said sheath into apertures or recesses in the substrate prior to hot isostatically pressing the substrate and sheath.

BACKGROUND ART

There has been a long-felt need to produce a long lasting feeder for flowing streams of molten inorganic material, such as glass, at operating temperatures that may be higher than currently practiced.

Much of the previous work was directed to forming the unalloyed alloys having superior properties over the unalloyed metals. Feeders in the textile art, or fixed bushing art, have historically been made from alloys of platinum and rhodium. Feeders in the wool art, or rotatable feeders, have been produced employing Cobalt based alloys.

The present invention provides inorganic fiber forming feeders wherein the high temperature strength characteristics of refractory metals are combined with the oxidation resistance of precious metals to produce feeders capable of operating at temperatures higher and longer periods of time than heretofore commercially practicable.

DISCLOSURE OF THE INVENTION

This invention pertains to a laminated wall for a feeder for supplying molten streams of inorganic material to be attenuated into filaments comprising a refractory metal core having an oxygen impervious, precious metal sheath intimately bonded thereto by hot isostatic pressing, wherein the sheath is cold isostatically pressed to said substrate to draw said sheath into apertures or recesses in the substrate prior to hot isostatically pressing the substrate and sheath, said wall having at least one orifice extending therethrough adapted to pass said molten material therethrough.

BRIEF DESCRIPTION OF THE DRAWINGS

FIG. 1 is a semi-schematic front elevational view of a glass textile type fiber forming system.

FIG. 2 is a semi-schematic front elevational view of a glass wool or rotary fiber forming system.

FIG. 3 is an exploded, enlarged cross sectional view of the sheath and core materials during fabrication.

FIG. 4 is an enlarged cross sectional view of a portion of the laminated feeder wall at another point during fabrication.

FIG. 5 is an enlarged cross sectional view of a feeder wall produced according to the principles of this invention.

BEST MODE OF CARRYING OUT THE INVENTION

As shown in FIG. 1, feeder 10, which is comprised of containment or sidewalls 12 and a bottom, discharge wall 14, is adapted to provide a plurality of streams of molten inorganic material, such as glass. The streams of molten glass can be attenuated into filaments 16 through the action of winder 26.

As is known in the art, size applicator means 18 is adapted to provide a coating or sizing material to the surface of the glass filaments which advance to gathering shoe or means 20 to be gathered into a strand or bundle 22. Strand 22 is then wound into package 24 upon a collet of winder 26. Thus, FIG. 1 schematically represents a "textile" fiber forming system.

As shown in FIG. 2, rotary system 40 is comprised of a flow means or channel 42 having a body of molten inorganic material 44, such as glass, therein. A stream of molten glass 46 is supplied to rotary feeder or rotor 50 from channel 42, as is known in the art.

Rotor 50, which is adapted to be rotated at high speeds, is comprised of a quill 52 and a circumferential discharge wall 54 having a plurality of passageways therethrough adapted to supply a plurality of streams of molten inorganic material to be fiberized.

In conjunction with rotor 50, a shroud 56 and circumferential blower or fluidic attenuation means 57 are adapted to fluidically assist in the attenuation of the streams of molten material into fibers or filaments 60. A binder material or coating may be applied to fiber 60 by means of binder applicators 58, as is known in the art.

As is shown in the drawings, the fiberization walls 14 and 54 of the feeders 10 and 50 should be based upon laminate comprised of a refractory metal core having an oxygen impervious, precious metal sheath intimately bonded thereto by hot isostatic pressing (i.e. HIP) as is disclosed in patent application Ser. No. 200,677, filed Oct. 27, 1980 and now abandoned, in the name of Mohinder S. Bhatti which is hereby incorporated by reference.

However, according to the instant invention, an additional step of cold isostatically pressing the loose first layer or sheath and the substrate to move the sheath into any apertures, recesses or the like to provide intimate contact therewith prior to the hot isostatic pressing provides a simple method of establishing a closely conforming sheath or layer of material around or next to the core or substrate.

Particularly, such refractory metals are selected from the group of materials consisting of molybdenum (Mo), columbium (Cb), tungsten (W), rhenium (Re), tantalum (Ta), hafnium (Hf), titanium (Ti), chromium (Cr), zirconium (Zr), vanadium (V) and base alloys of such refractory metals. For example, an alloy of molybdenum, titanium and zirconium, known as TZM, has been shown to provide a superior laminated wall for a fiber forming feeder when clad with a precious metal alloy of platinum and rhodium.

Particularly, the precious metals are selected from a group consisting of platinum (Pt), palladium (Pd), iridium (Ir), osmium (Os), rhodium (Rh), ruthenium (Ru), and alloys based on such metals. Included in the platinum alloys are H alloy and J alloy which are alloys of platinum and rhodium of 90%/10% and 75%/25% composition, respectively.

As disclosed in the aforementoned patent application, care should be taken in the preparation of the surfaces of the substrate and precious metal layers to insure a good bond between the core and sheath. That is, the surfaces thereof should be appropriately cleaned to promote a good metallurgical bond therebetween.

In the preparation of a laminated feeder wall 14 or 54, apertures 71 are formed in refractory metal core 70 which is then suitably cleaned. Foraminous core 70 is then inserted between first precious metal layer 78 and second precious metal layer 79 to form a pre-laminate unit. Plates or layers 78 and 79 can be formed such that the layers are sealed around the edges thereof by any suitable process, such as electron-beam welding. Or, a suitable precious metal frame positioned around the lateral periphery of core 70 may be employed with substantially flat plates 78 and 79 as set forth in the aforementioned pending patent application.

With the refractory metal core positioned between layer 78 and 79 and the edges sealed there around, except for one edge to permit outgassing of the thus formed pre-laminate unit, the pre-laminate unit is placed in a vacuum chamber, which may be heated, to withdraw any gas or volatilized contaminates from within the pre-laminate unit. Subsequent to the outgassing step, the final edge or edges of the precious metal layers are then sealed, under vacuum, by any suitable means such as electron-beam welding to complete the fabrication of the pre-laminate unit.

Then, according to the principles of this invention, the pre-laminate unit is cold isostatically pressed to cause a portion of first layer 78 and second layer 79 to flow into apertures 71 of core 70 such that first casings or drawn layers 81 and second casings or drawn layers 83 are formed in apertures 71.

Preferably, the pressure employed during the cold isostatic pressing step is sufficient to place the liners 81 and 83 into intimate contact with the walls of aperture 71 over the entire surface of core 70 defining each aperture 71. And more preferably, the layer 78 and 79, including linings 81 and 83, should be so pressed to form a mechanical bond between core 70 and layers 78 including 79 and linings 81 and 83.

As such, the pressure employed during the cold isostatic pressing step should be greater than or equal to about the yield strength of the precious metal layers at the temperature involved. Usually, the temperature of the system during cold isostatic pressing is approximately maintained at room temperature. If heat is employed during the first isostatic pressing step, the temperature should be substantially less than the temperature at which said precious metal layers tend to fuse or form a metallurigical bond with the core. Such low temperatures, it is believed, promote the complete flow of layers 78 and 79 into apertures 71, since excessive temperatures may cause fusion between core 70 and layers 78 and 79 and thus retard the flow of the layers completely into apertures 71.

Subsequent to the cold isostatic pressing step, the pre-laminate unit is then hot isostatically pressed to intimately or metallurgically bond the precious metal layers to the core to form laminate 69, including intimately or metallurgically bonding linings 81 and 83 to the walls to the refractory metal core defining aperatures 71. Thus, an oxygen impervious precious metal sheath 77 is laminated to core 70 to prevent the oxidation of the core at elevated temperatures encountered in, for example, glass fiber forming.

A web 86 is formed approximately in the middle of aperatures 71 from portions of layer 78 and 79 urged inwardly by the cold isostatic pressing step. Webs 86 may be removed by any suitable means, such as drilling, to form orifices 90 through laminate 69 to permit the flow of molten glass therethrough.

The orificed laminate can then be further fabricated into a stationary or rotary fiber-forming feeder with or without the inclusion of flow control means or eyelets or tips 92, as desired. Of course, to prevent the unwanted migration of molten glass between tips 92 and laminate 69, the tips 92 should be sealed, such as along the flange thereof to sheath 77, by any suitable means.

A laminated discharge wall for a fiber forming feeder was fabricated from a 0.060 inch thick TZM substrate having a plurality of 0.090 diameter apertures formed therein. The apertured substrate was then sealed between a pair of oxygen impervious, precious metal layers of platinum-rhodium alloy, each layer being 0.015 inch thick. Each of the precious metal layers was a substantially flat plate overlying the apertured region of core 70. After the CIP and HIP operations outlined herein, the diameter of the lined apertures were approximately 0.070 inch.

Subsequent to the outgassing of the pre-laminate unit, the pre-laminate unit was cold isostatically pressed, that is, at approximately room temperature, at 15,000 psi for about 10 minutes to move portions of the precious metal layers 78 and 79 into the apertures 71 in core 70 substantially as shown in FIG. 4.

Subsequent to the cold isostatic pressing step, the pre-laminate unit was then hot isostatically pressed at a temperature of about 2300° F. at 15,000 psi for about 1 hour to form a diffusion or metallurgical bond between core 70 and the precious metal layers 78 and 79, including linings 81 and 83 in apertures 71.

Although it is preferred that the cold isostatic pressing step leave the prelaminate unit with no voids between the walls of apertures 71 and linings 81 and 83, if the linings 81 and 83 are not completely in contact with the walls of apertures 71, the hot isostatic pressing step will further move the precious metal layers or linings into contact with the walls of the apertures to permit the diffusion or metallurgical bonding therebetween.

Also, it is believed that under the proper conditions and parameters, the cold isostatic pressing step may be eliminated and the precious metal layer overlying the recesses and the like may be drawn into the recesses and metallurgically bonded to the substrate, including the recesses thereof, in a single hot isostatic pressing step.

It is apparent that within the scope of the invention, modifications of different arrangements can be made other than as herein disclosed. The present disclosure is merely illustrative with the invention comprehending all variations thereof.

INDUSTRIAL APPLICABILITY

The invention described herein is readily applicable to the glass industry and, in particular, the glass fiber industry.

I claim:

1. A method of producing a glass fiber forming feeder for supplying molten streams of glass to be attenuated into filaments comprising:
  positioning a refractory metal core between oxygen impervious, precious metal layers to form a pre-laminate unit, said core having apertures extending therethrough;
  evacuating said pre-laminate unit;

joining said precious metal layers to seal said evacuated pre-laminate unit;

cold isostatically pressing said sealed unit to move a portion of said layers into said apertures into intimate contact with substantially all of the core defining said apertures; and then hot isostatically pressing said sealed unit to intimately bond said precious metal layers to said core including the portion of the core defining said apertures to form a laminate to prevent the oxidation of said core at elevated temperatures, said aperture being adapted to flow said molten glass therethrough to form said streams.

2. The method of claim 1 wherein the pressure of the cold isostatic pressing is sufficient to mechanically bond said layers to said core.

3. The method of claim 2 wherein said hot isostatic pressing effects a diffusion or metallurgical bond between the precious metal layers and the refractory metal core.

4. The method of claim 1 wherein the pre-laminate unit is evacuated and sealed by welding the edges of said precious metal layers under a vacuum.

5. A method of producing an inorganic fiber forming feeder comprising:

positioning a refractory metal core between oxygen impervious, precious metal layers to form a pre-laminate unit, said core having apertures extending therethrough;

evacuating said pre-laminate unit;

joining said precious metal layers to seal said evacuated pre-laminate unit;

cold isostatically pressing said sealed unit to move a portion of said layers into said apertures into intimate contact with substantially all of the core defining said apertures; and then hot isostatically pressing said sealed unit to intimately bond said precious metal layers to said core including the portion of the core defining said apertures to form said laminate to prevent the oxidation of said core at elevated temperatures.

6. The method of claims 1 or 5 wherein said cold isostatic pressing is effected substantially at room temperature.

7. The method of claims 1 or 5 wherein said cold isostatic pressing is effected at a temperature substantially less than the temperature at which said precious metal layers tend to fuse to said core.

8. The method of claim 7 wherein the pressure exerted during said cold isostatic pressing is greater than or equal to about the yield strength of said precious metal layers at the temperature of the cold isostatic pressing.

9. The method of claim 8 wherein the core is a material selected from the group consisting of Ti, V, Cb, Ta, Cr, Mo, W, Re and base alloys thereof and wherein said layers are a material of the group consisting of Pt, Pd, Ir, Os, Rh, Ru and base alloys thereof.

10. The method of claim 9 further comprising removing unwanted precious metal material from the precious metal lined apertures and joining a flow control element to said laminate at said aperture.

11. A method of fabricating laminated article for association with molten glass and oxygen containing gases comprising:

positioning a surface of a core in abutting relationship within an oxygen impervious, precious metal layer to form a pre-laminate unit, said surface having at least one recess therein adjacent said layer;

evacuating said pre-laminate unit;

sealing said evacuated pre-laminate unit;

cold isostatically pressing said sealed pre-laminate unit to move said precious metal layer into intimate contact with said surface including moving a portion of said precious metal layer into said recess into intimate contact with the core defining said recess, and then hot isostatically pressing said sealed unit to intimately bond said layer to said core including the core defining said recess, to form said laminate to prevent the oxidation of said refractory metal surface at elevated temperatures.

12. The feeder produced according to the method of claims 1, 5 or 9.

* * * * *